United States Patent [19]

Meininger

[11] 4,229,171

[45] Oct. 21, 1980

[54] PROCESS FOR THE PREPARATION OF FIBER-REACTIVE DYESTUFFS

[75] Inventor: Fritz Meininger, Frankfurt am Main, Fed. Rep. of Germany

[73] Assignee: Hoechst Aktiengesellschaft, Frankfurt am Main, Fed. Rep. of Germany

[21] Appl. No.: 948,907

[22] Filed: Oct. 5, 1978

[30] Foreign Application Priority Data

Oct. 10, 1977 [DE] Fed. Rep. of Germany ....... 2745480

[51] Int. Cl.$^2$ ...................... C09B 62/66; C09B 62/68; C09B 62/74; C09B 62/76
[52] U.S. Cl. ................................... 8/661; 260/146 D; 260/147; 260/153; 260/154; 260/156; 260/163; 260/162; 8/639; 8/640

[58] Field of Search ................... 260/153, 154, 146 D, 260/146 T, 146 R, 162, 163, 147, 314.5, 156; 8/1 C, 1 D, 1 P, 1 XA, 26, 27, 1 B, 1 E

[56] References Cited

U.S. PATENT DOCUMENTS

| 3,059,988 | 10/1962 | Koller et al. ............................... 8/26 |
| 3,082,207 | 5/1963 | Koller .................................... 8/1.3 X |
| 3,752,801 | 8/1973 | Hoelzle et al. ................... 260/146 T |

*Primary Examiner*—Floyd D. Higel
*Attorney, Agent, or Firm*—Curtis, Morris & Safford

[57] ABSTRACT

A fiber-reactive dyestuff mixture is obtained by reacting a phthalocyanine sulfochloride with an aromatic amine having a fiber-reactive group selected from vinyl sulfonyl, $\beta$-sulfatoethyl-sulfonyl and $\beta$-hydroxyethyl-sulfonyl groups, diazotizing unreacted amine in the resulting mixture and reacting the diazo compound in the mixture with a conventional coupling component to form a mixture of phthalocyanine and azo dyestuffs.

6 Claims, No Drawings

PROCESS FOR THE PREPARATION OF FIBER-REACTIVE DYESTUFFS

The present invention relates to a process for the preparation of fiber-reactive dyestuffs, their use, and leather as well as fiber materials dyed with the same.

Reactive dyes have been known which belong to the series of the metal-free or metal-containing phthalocyanine dyestuffs and which are prepared by the reaction of the corresponding phthalocyanine compounds containing sulfonic acid chloride or sulfonic acid and sulfonic acid chloride groups, with aniline or napthylamine compounds containing the fiber-reactive group (cf. German Pat. Nos. (1,179,317 and 1,283,977). However, this process has the drawback that the reaction of the phthalocyanine-sulfonic acid chloride compounds with the amine is not complete, so that part of the amine containing the fiber-reactive group is lost. It has therefore been the objective to avoid the loss of this amine and to use the same in a suitable manner for the preparation of dyestuffs.

It has now been found that the amount of the amine employed for the reaction of the known process may be utilized completely for the preparation of green, blue green and olive-green fiber-reactive dye mixtures, if the reaction of the phthalocyanine-sulfonic acid chloride compounds with the amine containing the fiber-reactive group, or with this amine and a further amine not containing any fiber-reactive group, is carried out in known manner and the unreacted amine with the fiber-reactive group is subsequently diazotized and coupled with a coupling component of the pyrazolone, aminopyrazole, pyridone or methylenecarboxylic acid arylamide series to form an azo dyestuff whose ground shade is yellow.

In this manner a dyestuff mixture of one or several phthalocyanine dyestuffs and one or several azo dyestuffs is obtained which as a whole is capable of dyeing the fiber material in green to blue green or olive-green shades. Since the degree of the above-mentioned reaction of the amine containing the fiber-reactive group with the phthalocyaninesulfonic acid chloride compound is in the range of from 50 to 80%, depending on the amine used and the reaction conditions employed, dyestuff products are obtained according to the process of the invention which contain the phthalocyanine dyestuff component and the azo dyestuff component approximately in a molar ratio of between 1:0.5 and 1:2.

The present invention provides in particular a process for preparing fiber-reactive dyestuff mixtures of phthalocyanine dyestuffs of the formula (1)

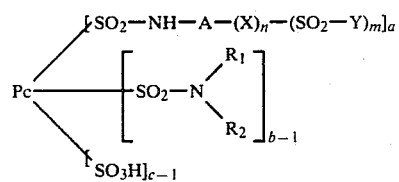 (1)

and azo dyestuffs of the formula (2)

$$(Y-O_2S)_m-(X)_n-A-N=N-K \quad (2)$$

(each in the form of an acid or as a salt, preferably the alkali metal or alkaline earth metal salt, such as the sodium, potassium or calcium salts), which comprises reacting a phthalocyanine sulfochloride which in the form of the free acid corresponds to the general formula (3)

 (3)

with an aromatic amine of the general formula (4)

$$H_2N-A-(X)_n-(SO_2-Y)_m \quad (4)$$

as such or—simultaneously or in any order—in conjunction with an amine of the formula (5)

 (5)

in water or in an organo-aqueous or in an organic solvent at a pH value of from about 4 to about 8 and at a temperature of from about −10° C. to about 100° C., preferably between 0° C. and about 40° C., in the presence of an acid binding agent, and subsequently diazotizing unreacted amine of the formula (4) in common manner as known to a person skilled in the art, and coupling said diazotized amine with a coupling component of the formula (6)

$$H-K \quad (6).$$

In the above formulae (1) to (6) the individual formula members have the following meanings:

Pc is a metal-free or metal-containing, preferably a metal-containing phthalocyanine radical, especially the copper, cobalt or nickel phthalocyanine radical, which does not contain any other substituent besides those indicated in the formula (1) which are arranged in the 3- or 4-positions of the carbocyclic aromatic radicals of the phthalocyanine skeleton, or which is substituted—besides by the substituents indicated in the formula (1) which are arranged in the 3- or 4-positions of the carbocyclic aromatic radicals of the phthalocyanine—also by other substituents, preferably phenyl radicals or halogen atoms, such as chorine atoms;

A is a phenylene or naphthylene radical which may contain further substituents, in particular substituents (preferably 1 or 2 substituents for A being phenylene, preferably from 1 to 3 substituents for A being naphthylene) from the group of hydroxy, lower alkyl, such as methyl and ethyl, lower alkoxy, such as methoxy and ethoxy, sulfo, carboxy, halogen, such as chlorine and bromine, nitro, phenylamino, lower alkanoylamino, such as acetylamino, benzoylamino and phenylsulfonylamino, the phenyl radicals of the latter also optionally being substituted by lower alkyl, lower akoxy and/or halogen, such as chlorine;

X is the group —$CH_2$— or —$N(CH_3)$—;

Y is the vinyl group, the β-sulfatoethyl or the β-hydroxyethyl group;

$R_1$ and $R_2$ are identical or different and each represent a hydrogen atom or an unsubstituted or substituted, preferably lower, alkyl group or an unsubstituted or substituted aryl radical, or $R_1$ and $R_2$ form together with the nitrogen atom and optionally a further hetero atom, such as a nitrogen or oxygen atom, a heterocyclic ring containing lower alkylene radicals, for example a piperidine, piperazine or morpholine ring;

m stands for the number 1 or 2;

n stands for the number 0 or 1;

a, b and c are identical or different and each represent a whole or fractional number of from 1 to 4, the sum of (a+b+c) being a whole or fractional number of 6 at a maximum;

p is a whole or fractional number of from 0 to 3, and q is a whole or fractional number of from 1 to 4, the sum of (p+q) being a whole or fractional number of 4 at a maximum;

K is the radical of a coupling component of a pyrazolone, an aminopyrazole, a pyridone or of a methylene carboxylic acid arylamide.

The dyestuff mixtures prepared according to the invention are preferably present in the form of their salts, especially the alkali metal salts, such as the sodium or potassium salts, or the alkaline earth metal salts, such as the calcium salts, and are preferably used in the form of these salts for the dyeing of fiber materials.

The term "lower" used in the above definitions means in this case and in the following that the alkyl or alkylene radical contained in the group consists of from 1 to 4 carbon atoms.

In case the two formula radicals $R_1$ and $R_2$ or either of them represent aryl radicals or substituted alkyl radicals, the alkyl radicals are preferably lower alkyl radicals which are substituted by 1 or 2 substituents from the group of hydroxy, sulfo, carboxy and phenyl, and the aryl radicals are preferably phenyl radicals which may be substituted by, —preferably 1 or 2—, substituents from the group of methyl, chlorine, carboxy and sulfo.

The compounds of the formula (1) may also be present in the form of mixtures of compounds of the formula (1) with a different substitution degree due to the radicals designated by the indices a, b and c. Mixtures are present in those cases in which one of the indices a, b and c represents a fractional number. Such mixtures are formed in the preparation of the compounds of the formula (1) owing to the different condensation degree of the amines with the phthalocyanine-sulfochloride according to the mode of operation described above and/or owing to the different sulfonation degree and to the different hydrolysis degree of the sulfochloride groups in the starting compounds.

When starting from initial compounds of the formula (4) in which Y stands for the β-hydroxyethyl group, the β-hydroxyethyl group in the dyestuff mixture obtained according to the invention may be converted in known manner with a sulfatization agent into the corresponding sulfuric acid-monoester compound which optionally may then be converted in common manner by the action of an alkaline agent into the vinyl sulfonic group by splitting off the sulfato group.

Preference is given to the preparation of those mixtures of dyestuffs of the formulae (1) and (2) in which Pc, X, Y, $R_1$, $R_2$, m, n, a, b and c are defined as above and A stands for a phenylene or naphthylene radical which may be substituted by 1 or 2 substituents from the group of lower alkyl, lower alkoxy, sulfo, carboxy, chlorine and bromine, and K stands for one of the following radicals of the formulae (7) to (12):

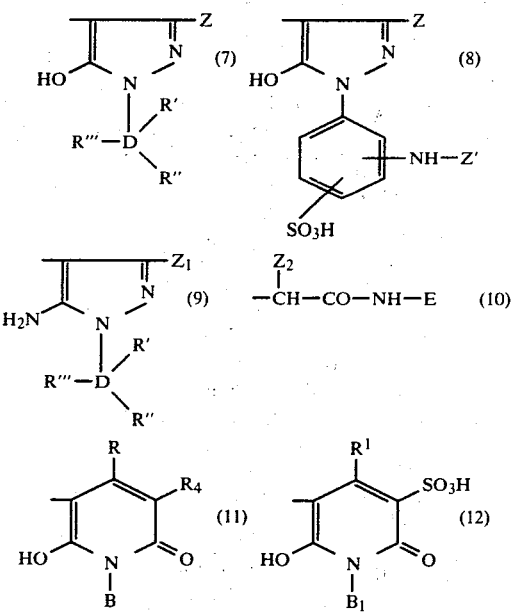

In these formulae (7) to (12) the individual formula radicals have the following meanings:

Z is the carboxy group, a lower alkyl group, such as methyl, a lower carbalkoxy group, such as the carbomethoxy group or the carbethoxy group, a carboxylic acid-phenyl ester group or a carbonamide group;

D is the benzene or naphthalene nucleus;

R', R" and R''' are identical or different and

R' is hydrogen, chlorine or bromine, lower alkyl, such as methyl or ethyl, lower alkoxy, such as methoxy or ethoxy, sulfo, nitro, carboxy, vinylsulfonyl, β-hydroxyethylsulfonyl or β-sulfatoethyl sulfonyl;

R" is hydrogen, lower alkyl, such as methyl or ethyl, lower alkoxy, such as methoxy or ethoxy, or sulfo;

R''' is hydrogen or chlorine;

Z' is a fiber-reactive group, especially a mono- or dichlorotriazinyl radical of a fluoro-chloro-pyrimidine radical;

$Z_1$ has the above meaning of Z or is a phenyl radical which may be substituted by 1 or 2 substituents selected from the group of lower alkyl, such as methyl, lower alkoxy, such as methoxy, chlorine and acetylamino;

$Z_2$ stands for the cyano, carboxy or acetyl group;

E is the benzene or naphthalene nucleus which may be substituted by from 1 to 3 substituents selected from the group of lower alkyl, such as methyl and ethyl, lower alkoxy, such as methoxy and ethoxy, sulfo, bromine, chlorine, vinylsulfonyl, β-sulfatoethyl-sulfonyl, β-hydroxyethyl-sulfonyl, acetylamino, phenylamino-carbonyl and benzoylamino, the phenyl radicals of the latter substituents also optionally being substituted by 1 or 2 substituents selected from the group of methyl, methoxy, chlorine and sulfo;

R is a hydrogen atom or a lower alkyl group, such as methyl;

$R_4$ is hydrogen, lower alkyl, such as methyl, lower sulfoalkylene, such as sulfomethylene, cyano or carbamoyl;

B is hydrogen, lower alkyl, such as methyl or ethyl, which may be substituted by phenyl or sulfophenyl;

R¹ is hydrogen, lower alkyl or substituted lower alkyl, for example by lower alkoxy, such as methoxy, or by an acylamino radical, such as an acetylamino, benzoylamino, mono- or dichlorotriazinylamino radical, or by the cyano group, or is lower alkenyl, cycloalkyl of from 5 to 8 carbon atoms, cycloalkenyl of from 5 to 8 carbon atoms, an optionally substituted aryl group, such as phenyl or phenyl substituted by substituents selected from the group of carboxy, sulfo, aryloylamino, such as benzoylamino, acetylamino, vinylsulfonyl, β-hydroxyethyl-sulfonyl, β-sulfatoethyl-sulfonyl and a radical selected from the chloro- or fluoro-triazinylamino series, or is a radical selected from the chloro- or fluoro-triazinylamino series;

$B_1$ has the above meaning of R¹ or is an amino group which is unsubstituted or substituted by phenyl, lower alkyl and/or an acyl radical, such as acetyl, benzoyl, acryloyl, chloroacryloyl and bromoacryloyl, or by a radical from the chloro- or fluoro-triazinyl series.

The radical K of a coupling component may also have the general formula

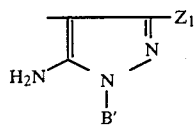

in which $Z_1$ is defined as above and B' stands for hydrogen or lower alkyl, such as methyl.

In the phthalocyanine-sulfonic acid chlorides of the formula (3) the sulfonic acid chloride group as well as optionally present sulfonic acid groups are arranged in the 3- or 4-positions of the carbocyclic aromatic nuclei of the phthalocyanine skeleton. As starting compounds of the formula (3) there are used, for example, sulfonic acid chlorides or sulfo group-containing sulfonic acid chlorides of the metal-free phthalocyanine, however, preferably sulfonic acid chlorides of metal-containing phthalocyanines, such as di-, tri- or tetrasulfonic acid chlorides in the 3- or 4-position of copper phthalocyanine, cobalt phthalocyanine or nickel phthalocyanine, for example, copper phthalocyanine-(3) -disulfonic acid chloride, copper phthalocyanine-(3)-trisulfonic acid chloride, nickel phthalocyanine-(3)-tetrasulfonic acid chloride, cobalt phthalocyanine-(3)-trisulfonic acid chloride, copper phthalocyanine-(4)-disulfonic acid chloride or copper phthalocyanine-(4)-tetrasulfonic acid chloride, copper phthalocyanine-(3)-disulfonic acid chloride-disulfonic acid, copper phthalocyanine-(3)-trisulfonic acid chloride-monosulfonic acid, furthermore analogous sulfonic acid chlorides which may additionally contain other substituents at the phthalocyanine nucleus, such as phenyl radicals and halogen atoms, for example sulfonic acid chlorides of tetraphenyl-copper phthalocyanine or of tetrachloro-nickel phthalocyanine.

The sulfonic acid chlorides of the formula (3) are prepared according to known processes, for example according to the process of German Patent Specification No. 891 121.

Furthermore, in the process of the invention preference is given to the preparation of reactive dyestuff mixtures of dyestuffs corresponding to the formulae (1) and (2) in which Pc is a copper or nickel phthalocyanine radical having the meaning given above, A represents the phenylene radical which may be substituted by 1 or 2 substituents selected from the group of lower alkyl and lower alkoxy, n stands for zero, Y is the vinyl or β-sulfatoethyl radical, $R_1$ and $R_2$ are identical or different and each represent hydrogen or lower alkyl, m is the integer 1 and a, b and c are defined as above, and K is the radical of a coupling component of a pyrazolone or pyridone.

Moreover, it is preferred to prepare, according to the process of the invention, fiber-reactive dye mixtures consisting of a copper phthalocyanine dyestuff of the formula (1a)

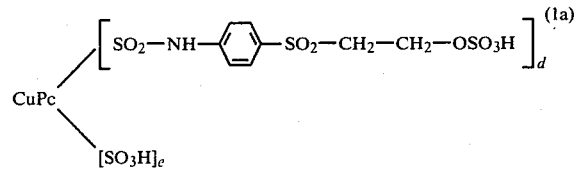

or of a nickel phthalocyanine dyestuff of the formula (1b)

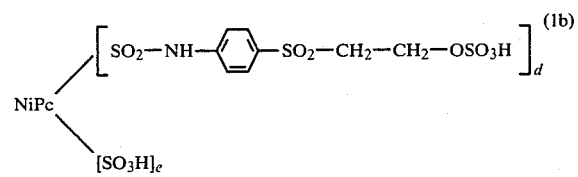

and of the azo dyestuff of the formula (2a)

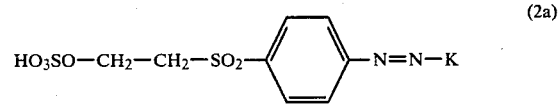

in which d and e are identical or different and each represent a whole or fractional number of from 1 to 4, the sum of (d+e) being a whole or fractional number of 4 at a maximum, and K is the radical of a coupling component of a pyrazolone or pyridone, and Pc has the above-mentioned meaning of the phthalocyanine radical; this preferred process variant is carried out by reacting a copper phthalocyanine sulfochloride, respectively a nickel phthalocyanine sulfochloride, corresponding in the form of the free acid to the general formula (3a) or (3b)

in which Pc, p and q are defined as above, with an aromatic amine of the formula (4a)

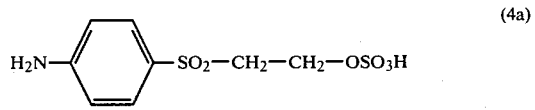

and diazotizing subsequently unreacted amine of the formula (4a) and coupling it with a coupling component of the formula H-K, K being defined as in formula (2a) above.

As diazotizable aromatic amines which may be used according to the invention there may be mentioned, for example, the following compounds:

β-Hydroxyethyl-(3-amino-phenyl)-sulfone, β-hydroxyethyl-(4-amino-phenyl)-sulfone, β-hydroxyethyl-(3-amino-4-hydroxyphenyl)-sulfone, β-hydroxyethyl-(3-amino-4-methoxy-phenyl)-sulfone, β-hydroxyethyl-(3-hydroxy-4-amino-phenyl)-sulfone, β-hydroxyethyl-(3-methoxy-4-amino-phenyl)-sulfone, β-hydroxy-(3-amino-4-methyl-phenyl)-sulfone, β-hydroxy-ethyl-(3-amino-4-sulfo-phenyl)-sulfone, β-hydroxyethyl-(3-bromo-4-amino-phenyl)-sulfone, β-hydroxy-(3-amino-4-carboxy-phenyl)-sulfone, β-hydroxyethyl-(2,5-dimethoxy-4-amino-phenyl)-sulfone, β-hydroxyethyl-(2-ethyl-4-amino-5-methoxy-phenyl)-sulfone, β-hydroxyethyl-[3-nitro-4-(4'-aminophenylamino)-phenyl]-sulfone, β-hydroxyethyl-[4-amino-naphthyl-(1)]-sulfone, β-hydroxyethyl-[5-amino-naphthyl-(1)]-sulfone, β-hydroxyethyl-[6-amino-naphthyl-(2)]-sulfone, β-hydroxyethyl-[3-(4'-amino-benzoylamino)-4-hydroxyphenyl]-sulfone, β-hydroxyethyl-[3-(4'-amino-benzoylamino)-phenyl]-sulfone, β-hydroxyethyl-[3-amino-4-hydroxy-5-nitrophenyl]-sulfone, β-hydroxyethyl-[4-(3'-aminophenyl-sulfonylamino)-phenyl]-sulfone, 3-(N-methyl-N-isoethionylamino)-1-aminobenzene, 4-(N-methyl-N-isoethionylamino)-1-aminobenzene, 2-methoxy-4-(N-methyl-N-isoethionylamino)-1-aminobenzene, β-hydroxyethyl-(3-amino-4-methoxy-benzyl)-sulfone, bis-β-hydroxyethyl-[3-amino-naphthyl-(1,5)]-sulfone, bis-β-hydroxyethyl-[7-amino-naphthyl-(1,3)]-sulfone, β-hydroxyethyl-[5-amino-3-sulfo-naphthyl-(1)]-sulfone or β-hydroxyethyl-[7-amino-3-sulfo-naphthyl-(1)]-sulfone.

The above-mentioned amines containing the β-hydroxyethyl-sulfone group are preferably used in the form of their acid sulfuric acid esters or in the form of their corresponding vinylsulfone compounds.

As appropriate amines of the above-specified formula (5) which may optionally be used for the preparation of the fiber-reactive dye mixtures there may be mentioned, for example, the following:

Ammonia, methylamine, ethylamine, n-butylamine, benzylamine, ethanolamine, dimethylamine, diethylamine, diisopropylamine, N-methyl-benzylamine, piperidine, morpholine, 2-aminoethane-1-sulfonic acid or 2-aminoethane-1-carboxylic acid.

In the process according to the invention, it is advantageous to use about 1.5 to 6 moles of an amine of the formula (4) for 1 mole of a phthalocyanine-sulfonic acid chloride of the formula (3).

The reaction according to the invention of phthalocyanine-sulfonic acid chlorides with amines of the general formula (4) and/or with amines of the general formula (5) is carried out preferably in an aqueous medium, depending on the solubility in a solution or suspension, in the presence of an acid-binding agent.

As acid-binding agents there may be used, for example, sodium bicarbonate, sodium carbonate or sodium hydroxide, furthermore, tertiary organic bases, such as pyridine or triethylamine, or an excess amount of the amine of the general formula (5). The reaction is performed at slightly acid to slightly alkaline pH values. If use is made of amines of the general formula (4), it is recommended to work in a neutral to slightly acid medium in order to avoid side reactions. The reaction may be carried out within a wide temperature range, suitably at a temperature between about $-5°$ C. to $+70°$ C.

If the reaction is carried out in an organo-aqueous or organic solvent, there is used as organic solvent preferably an amide of an aliphatic or cycloaliphatic carboxylic acid, such as dimethylformamide, methylacetamide and N-methylpyrrolidone.

The reaction according to the invention of the phthalocyanine-sulfochlorides of the formula (3) with amines of the formula (4) as well as optionally with amines of the formula (5) is followed in accordance with the invention by a second reaction step wherein the diazotizable aromatic amine of the general formula (4) which has not been used up in the condensation step is diazotized in the dyestuff solution and the diazonium salt formed in the dyestuff solution is coupled with a coupling component of the pyrazolone, aminopyrazole, pyridone or β-ketocarboxylic acid-arylamide series to give an azo dyestuff.

The diazotization of the amines which are present in the aqueous phthalocyanine dyestuff solution or dyestuff suspension is carried out in common manner in a mineral acid or acetic medium by adding sodium nitrite.

As coupling components which may be used according to the invention there may be mentioned for example the following compounds:

1-Phenyl-3-carboxy-pyrazolone-(5),
1-(4'-sulfo-phenyl)-3-carboxy-pyrazolone-(5),
1-(2',5'-dichloro-4'-sulfo-phenyl)-3-methyl-pyrazolone-(5),
1-(4',8'-disulfo-2'-naphthyl)-3-methyl-pyrazolone-(5),
1-(4'-β-sulfatoethylsulfonyl-phenyl)-3-methyl-pyrazolone-(5),
1-(4'-β-sulfatoethylsulfonyl-phenyl)-3-carboxy-pyrazolone-(5),
1-(2'sulfo-phenyl)-3-methyl-pyrazolone-(5),
1-(3'sulfo-phenyl)-3-methyl-pyrazolone-(5),
1-(2',5'-disulfo-phenyl)-3-methyl-pyrazolone-(5),
1-(3'-carboxy-phenyl)-3-methyl-pyrazolone-(5),
1-(2'-methyl-4'-sulfo-phenyl)-3-methyl-pyrazolone-(5),
1-(2'-chloro-5'-sulfo-phenyl)-3-methyl-pyrazolone-(5),
1-(6'-chloro-2'-methyl-4'-sulfo-phenyl)-pyrazolone-(5),
1-(6'-sulfo-2'-naphthyl)-3-methyl-pyrazolone-(5),
1-(5',7'-disulfo-2'-naphthyl)-3-methyl-pyrazolone-(5),
1-(3'-nitro-phenyl)-3-carboxy-pyrazolone-(5),
1-(2'-sulfo-phenyl)-3-carboxy-pyrazolone-(5),
1-(2',5'-disulfo-phenyl)-3-carboxy-pyrazolone-(5),
1-(4'-sulfo-phenyl)-3-carbethoxy-pyrazolone-(5),
1-(4'-β-sulfatoethylsulfonyl-phenyl)-3-methyl-pyrazolamine-(5),
1-(2'-methoxy-5'-β-sulfatoethylsulfonyl-phenyl)-3-phenylpyrazolamine-(5),
1-(4'sulfo-phenyl)-3-(4''-chloro-phenyl)-pyrazolamine-(5),
1-(2',5'-dichloro-4'-sulfo-phenyl)-3-phenyl-pyrazolone-(5),
1-(2'-methyl-4'-sulfo-6'-chloro-phenyl)-3-phenyl-pyrazolamine-(5),
1-(2',5'-dichloro-4'-sulfo-phenyl)-3-(4''-acetamino-phenyl)-pyrazolamine-(5),
1-(4'-sulfo-phenyl)-3-(4''-methyl-phenyl)-pyrazolamine-(5), or
1-(2',5'-dichloro-4'-sulfo-phenyl)-3-methyl-pyrazolamine(5),
1-acetoacetylamino-3-methyl-5-methoxy-benzene-4-sulfonic acid,
1-acetoacetylamino-benzene-4-sulfonic acid, 2-acetoacetylamino-naphthalene-5,7-disulfonic acid,
2-acetoacetylamino-naphthalene-6,8-disulfonic acid,
1-(4'-acetoacetylamino-benzoyl)-aminobenzene-2,5-disulfonic acid,
1-acetoacetylamino-naphthalene-4,8-disulfonic acid,
cyanoacetic acid -(4-β-sulfatoethylsulfonyl)anilide,
N-(4-β-sulfatoethyl-sulfonyl-phenyl)-malonic acid amide,
cyanoacetic acid-2-naphthylamide-6,8-disulfonic acid,
cyanoacetic acid-2-naphthylamide-5,7-disulfonic acid,
cyanoacetic acid-anilide-2,5-disulfonic acid.
6-Hydroxy-4-methyl-2-pyridone,
6-hydroxy-N-4'-sulfophenyl-4-methyl-3-aminocarbonyl-2-pyridone,
6-hydroxy-1-β-(4'-sulfophenyl)-ethyl-4-methyl-2-pyridone,
6-hydroxy-N-ethyl-4-methyl-3-cyano-2-pyridone,
6-hydroxy-N-ethyl-4-methyl-3-amino-carbonyl-2-pyridone,
6-hydroxy-N-ethyl-4-methyl-3-sulfomethyl-2-pyridone,
6-hydroxy-2-pyridone-3-sulfonic acid,
6-hydroxy-4-β-methoxyethyl-2-pyridone-3-sulfonic acid,
6-hydroxy-4-β-acetaminoethyl-2-pyridone-3-sulfonic acid,
6-hydroxy-4-ethyl-2-pyridone-3-sulfonic acid,
6-hydroxy-4-propyl-2-pyridone-3-sulfonic acid,
6-hydroxy-4-isopropyl-2-pyridone-3-sulfonic acid,
6-hydroxy-4-butyl-2-pyridone-3-sulfonic acid,
6-hydroxy-4-phenyl-2-pyridone-3-sulfonic acid,
6-hydroxy-4-4'-sulfophenyl-2-pyridione-3-sulfonic acid,
6-hydroxy-4-4'-aryloylaminophenyl-2-pyridone-3-sulfonic acid,
6-hydroxy-N-methyl-2-pyridone-3-sulfonic acid,
6-hydroxy-N-methyl-4-methyl-2-pyridone-3-sulfonic acid,
6-hydroxy-N-methyl-4-butyl-2-pyridone-3-sulfonic acid,
6-hydroxy-N-methyl-4-phenyl-2-pyridone-3-sulfonic acid,
6-hydroxy-N-methyl-4-sulfophenyl-2-pyridone-3-sulfonic acid,
6-hydroxy-N-methyl-4,4'-dichlorotriazinylaminophenyl-2-pyridone-3-sulfonic acid,
6-hydroxy-N-ethyl-4-methyl-2-pyridone-3-sulfonic acid,
6-hydroxy-N-ethyl-4-sulfophenyl-2-pyridone-3-sulfonic acid,
6-hydroxy-N-propyl-4-ethyl-2-pyridone-3-sulfonic acid,
6-hydroxy-N-butyl-4-butyl-2-pyridone-3-sulfonic acid,
6-hydroxy-N-cyclohexyl-4-methyl-2-pyridone-3-sulfonic acid,
6-hydroxy-N-3'- or -4'-β-hydroxyethylsulfonylphenyl-2-pyridone-3-sulfonic acid,
6-hydroxy-N-3'- or -4'-β-hydroxyethylsulfonylphenyl-4-methyl-2-pyridone-3-sulfonic acid,
6-hydroxy-N-3'- or -4'-β-sulfatoethylsulfonylphenyl-4-methyl-2-pyridone-3-sulfonic acid,
6-hydroxy-N-amino-4-methyl-2-pyridone-3-sulfonic acid,
6-hydroxy-N-acetylamino-2-pyridone-3-sulfonic acid,
6-hydroxy-N-acryloylamino-4-methyl-2-pyridone-3-sulfonic acid,
6-hydroxy-N-s-dichlorotriazinylamino-4-ethyl-2-pyridone-3-sulfonic acid,
6-hydroxy-N-s-methoxy-chlorotriazinylamino-4-β-acylaminoethyl-2-pyridone-3-sulfonic acid,
6-hydroxy-N-β-carboxydichloropyridiazinylaminoethyl-2-pyridone-3-sulfonic acid,
6-hydroxy-N-β-(α-bromoacryloylamino)-ethyl-4-sulfophenyl-2-pyridone-3-sulfonic acid,
6-hydroxy-N-carboxyphenyl-4-methyl-2-pyridone-3-sulfonic acid,
6-hydroxy-N-s-chloroaminotriazinyl-aminophenyl-4-ethyl-2-pyridone-3-sulfonic acid,
6-hydroxy-N-s-difluorotriazinyl-aminophenyl-4-acetylaminoethyl-2-pyridone-3-sulfonic acid, or
6-hydroxy-N-s-dichlorotriazinyl-aminosulfophenyl-4-ethyl-2-pyridone-3-sulfonic acid.

The coupling according to the invention of the above-mentioned components with the diazotized amines of the formula (4) which are in the preparation mixture, may be effected in accordance with or analogously to known methods in a slightly alkaline to slightly acid solution and at a temperature which should be in a rather low range, for example from 0° to +10° C. If components are used which contain once or several times a vinylsulfone or a β-sulfatoethylsulfone group or other fiber-reactive radicals, it is recommended to carry out the coupling suitably in a neutral to slightly acid medium in order to avoid side reactions.

On the other hand, if the coupling is carried out with those components which contain the β-hydroxyethylsulfone group once or several times, the coupling may be followed by a further reaction step in which the mixture of dyestuffs with β-hydroxyethylsulfone groups obtained at first is converted into a mixture of dyestuffs with β-sulfatoethylsulfone groups by a treatment with appropriate compounds yielding sulfur trioxide.

From the class of compounds yielding sulfur trioxide, which may be used for this third reaction step, there may be mentioned, for example, sulfuric acid, chlorosulfonic acid and amidosulfonic acid. The reaction with sulfuric acid is carried out preferably without solvent or in an excess amount of this acid serving as solvent; the reaction with the above-mentioned acid derivatives used as esterification agents is preferably performed in the presence of anhydrous solvents or diluents which simultaneously act as acid-binding agents, such as pyridine or α-picoline.

The dyestuffs present in the preparation mixtures which contain once or several times a β-sulfatoethylsulfone group may be converted optionally into dyestuffs with vinylsulfone groups by a treatment with agents showing an alkaline action, such as sodium carbonate or sodium hydroxide.

The isolation of the dyestuff mixtures obtained according to the two processes of the invention described above is effected by salting-out, for example with sodium or potassium chloride, and/or by acidification with a mineral acid or by evaporating the neutral or slightly acid aqueous dyestuff solutions, preferably at a moderately elevated temperature and reduced pressure.

The dyestuff mixtures which are obtained according to the process described above are suitable for the dyeing and printing of fiber materials made of wool, silk, linear polyamides, especially of materials containing hydroxyl groups, such as cellulose, for example linen, regenerated cellulose and above all cotton, and also of leather.

The preparation of the dyeings is effected in known manner, for example, by direct dyeing from a dye bath containing agents which show an alkaline action and optionally inorganic salts, such as alkali metal chlorides or alkali metal sulfates, at room temperature or elevated temperature, for example from about 40° to about 100° C.

However, if the dyestuff mixtures have no affinity or only a minor affinity to the fiber, the process is carried out advantageously by impregnating the fiber material with the aqueous solutions of the dyestuff mixtures in the cold or at a moderate temperature, by squeezing the material and fixing the dyestuff mixtures applied optionally following an intermediate drying; these dyestuff solutions may contain additionally an agent which has an alkaline action, and an inorganic salt.

If the padding liquor used contains an agent showing an alkaline action, the subsequent fixation is performed, for example, by steaming, thermosetting or by allowing the impregnated material to dwell for several hours. Decisive factors for the choice of the fixation process are the type and the amount of the alkali used.

When using impregnation baths which do not contain an agent showing an alkaline action, the impregnated material is first introduced, for example, into a salt-containing alkaline bath and is thereafter subjected to one of the above-described fixation processes.

As agents showing an alkaline action there are used preferably alkali metal hydroxides, carbonates, bicarbonates, phosphates, borates or silicates or alkali metal salts of trichloroacetic acid, or mixtures of the specified compounds.

For the use in textile printing the dyestuff mixtures are dissolved in water, optionally while adding common auxiliary agents, such as urea or dispersing agents, and are then added to thickening agents, such as methyl cellulose or alginate thickeners. The above-described agents showing an alkaline action are then added to the pastes thus obtained, and the material is printed in common manner. The fixation is thereupon effected by steaming or thermosetting in known manner.

However, the fiber material may also be printed with neutral or slightly acid printing pastes which do not contain any agent showing an alkaline action. In this case the fiber material is treated, either before or after the printing, with an agent showing an alkaline action, for example by way of a short passage through a salt-containing alkaline solution, and is subsequently subjected to one of the above-mentioned fixation processes. However, the fixation may also be effected in a very simple manner by passing the printed material through a hot salt-containing alkaline solution.

The dyestuff mixtures prepared according to the process of the invention yield on the fiber materials specified above full green to olive-green dyeing and prints which are marked by good fastness properties to wetting and good to very good fastness properties to light.

The dyestuff mixtures prepared according to the processes of the invention are distinguished by their superior water-solubility which surpasses that of the corresponding individual dyestuffs. This superior water-solubility makes them particularly suitable for dyeing processes for which the individual dyestuffs do not show a sufficient solubility. Due to their superior water-solubility, selected dyestuff mixtures may also be used for the preparation of concentrated liquid formulations, optionally with the addition of solvents and stabilizers.

The process of the invention, which can easily be carried out on a technical scale, is based on the observation that the condensation of phthalocyanine-polysulfochlorides of the general formula (3) with diazotizable aromatic amines of the formula (4) in the aqueous medium is effected only to an insufficient degree, so that these amines are partly lost in the technical execution or could be recovered only by a great and uneconomical expenditure from the waste waters.

The process of the invention is thus technically progressive and serves above all the complete utilization of high-grade dyestuff intermediates and the pollution control of production waste waters.

The following Examples illustrate the present invention. Parts and percentages are by weight, unless stated otherwise. Parts by weight to parts by volume are as the kilogram to the liter.

EXAMPLE 1

(a) 97 Parts of copper phthalocyanine-(3)-tetrasulfonic acid chloride are introduced in the form of a moist paste into an ice cold, neutralized solution of 69.7 parts of the acid sulfuric acid ester of $\beta$-hydroxyethyl(4-amino-phenyl)-sulfone in 300 parts of water, while stirring thoroughly. Thereafter 5 parts of pyridine are added, and the mixture is stirred at 10° C. while adding continuously sodium bicarbonate, thus maintaining a pH value of from 6.0 to 6.5. After about 5 hours, when the reaction has practically come to a stop, the reaction mixture is allowed to reach room temperature and is continued to be stirred for another 10 to 15 hours at this temperature.

(b) Subsequently 30 parts by volume of a 31% hydrochloric acid are added, the mixture is cooled to 5° C. by adding ice and is diazotized by the addition of 21.5 parts by volume of an aqueous 5 N-sodium nitrite solution. Stirring is continued for 20 minutes at this temperature, and then 27.3 parts of 1-(4'-sulfo-phenyl)-3-methyl-pyrazolone-(5) are strewn into the blue dyestuff solution. By a continuous addition of sodium carbonate the coupling reaction is performed at a pH value of 6. When the coupling has been completed, the intensely green dyestuff solution is filtered and spray-dried. 241 Parts of a salt-containing dark green dyestuff are obtained which is very easily soluble in water and dyes cotton in green shades of a good fastness to washing and to light.

(c) Green to olive-green dyestuff mixtures having similar properties are obtained, if in the above Example there is used, instead of the acid sulfuric acid ester of $\beta$-hydroxyethyl-(4-amino-phenyl)-sulfone, an equivalent amount of the acid sulfuric acid ester of the following amines with a $\beta$-hydroxyethyl-sulfone group:

$\beta$-Hydroxyethyl-(3-amino-phenyl)-sulfone,
$\beta$-hydroxyethyl-(3-amino-4-methoxy-phenyl)-sulfone,
$\beta$-hydroxyethyl-(3-methoxy-4-amino-phenyl)-sulfone,
$\beta$-hydroxyethyl-(3-amino-4-methyl-phenyl)-sulfone,
$\beta$-hydroxyethyl-(3-amino-4-sulfo-phenyl)-sulfone,
$\beta$-hydroxyethyl-(3-bromo-4-amino-phenyl)-sulfone,
$\beta$-hydroxyethyl-(3-amino-4-carboxy-phenyl)-sulfone,
$\beta$-hydroxyethyl-(3-amino-4-hydroxy-phenyl)-sulfone,
$\beta$-hydroxyethyl-(3-hydroxy-4-amino-phenyl)-sulfone,
$\beta$-hydroxyethyl-(2,5-dimethoxy-4-amino-phenyl)-sulfone,
$\beta$-hydroxyethyl-(2-methyl-4-amino-5-methoxyphenyl)-sulfone, or
$\beta$-hydroxyethyl-[3-(4'-aminobenzoylamino)-4-hydroxyphenyl]-sulfone.

(d) If in the above Example there are used 84.3 parts of 112.5 parts of the acid sulfuric acid ester of $\beta$-hydroxyethyl-(4-amino-phenyl)-sulfone instead of 69.7 parts of this ester compound, and if there are used 35.9 parts or 55.9 parts of 1-(4'-sulfo-phenyl)-3-methyl-pyrazolone- (5) instead of 27.3 parts of this pyrazolone, dyestuff mixtures are obtained which dye cotton in very yellowish clear green shades.

EXAMPLE 2

(a) 96.5 Parts of nickel phthalocyanine-(3)-tetrasulfonic acid chloride are introduced in the form of a moist paste into an ice cold, neutralized solution of 84.3 parts of the acid sulfuric acid ester of β-hydroxyethyl(4-amino-phenyl)-sulfone in 300 parts of water, while stirring thoroughly. Thereafter 5 parts of pyridine are added, and the mixture is stirred at 10° C. while adding continuously sodium bicarbonate, thus maintaining a pH value of 6.0 to 6.5. When the reaction has been finished, stirring is continued for another 10 hours at 20° C.

(b) Subsequently 40 parts by volume of a 31% hydrochloric acid are added, the mixture is cooled to 5° C. by introducing ice powder and is diazotized at this temperature by the addition of 26 parts by volume of an aqueous 5 N-sodium nitrite solution. Stirring is continued for 20 minutes at this temperature, and then 37 parts of 1-(4'-sulfo-phenyl)-3-carboxy-pyrazolone-(5) are strewn into the dyestuff solution. By a continuous addition of sodium carbonate the pH value is adjusted to 5.5 to 6.0, and the coupling reaction is performed at this pH value. Thereafter the intensely green dyestuff solution is filtered and spray-dried. 251 Parts of a salt-containing dark green dyestuff powder are obtained, which powder is very easily soluble in water. If applied in usual manner on cotton and fixed on it in the presence of an agent having an alkaline action, green dyeings and printing patterns on said fiber material are obtained which are very fast to the action of light and to washing.

(c) Green to olive-green dyestuff mixtures having similar properties are obtained, if in the present Example there is used, instead of the acid sulfuric acid ester of β-hydroxyethyl-(4-amino-phenyl)-sulfone, an equivalent amount of the acid sulfuric acid ester of the following amines with a β-hydroxyethylsulfone group:
4-(N-Methyl-N-ethionylamino)-1-aminobenzene,
3-(N-methyl-N-ethionylamino)-1-aminobenzene,
3-methoxy-4-(N-methyl-N-ethionylamino)-1-aminobenzene,
β-hydroxyethyl-[4-amino-naphthyl-(1)]-sulfone,
β-hydroxyethyl-[5-amino-naphthyl-(1)]-sulfone,
β-hydroxyethyl-[6-amino-naphthyl-(1)]-sulfone, or
β-hydroxyethyl-[7-amino-3-sulfo-naphthyl-(1)]-sulfone.

(d) Dyestuff mixtures having similar properties are obtained, if there is used in the above reaction, instead of the nickel phthalocyanine-(3)-tetrasulfonic acid chloride, an equivalent amount of copper phthalocyanine(3)-tetrasulfonic acid chloride or of the sulfonic acid chlorides of cobalt phthalocyanine, of tetraphenyl-copper phthalocyanine or of metal-free phthalocyanine.

EXAMPLE 3

69.7 Parts of the acid sulfuric acid ester of β-hydroxyethyl-(4'-amino-phenyl)-sulfone are reacted according to paragraph (a) of Example 1 with 97 parts of copper phthalocyanine-(3)-tetrasulfonic acid chloride. 30 Parts by volume of a 31% hydrochloric acid are added to the dyestuff solution thus obtained, which is cooled to +5° C. and then diazotized with 21.5 parts by volume of an aqueous 5 N-sodium nitrite solution until the dissolved amine has reacted completely. Stirring is continued for 20 minutes at 5° C., and subsequently 31.4 parts of 1-(4'-sulfo-phenyl)-3-carboxy-pyrazolone-(5) are strewn into the blue dyestuff solution. By the continuous addition of about 30 parts of sodium carbonate the pH value of 5.5 is maintained. After the coupling has been completed, the green dyestuff solution formed is filtered and evaporated under reduced pressure at a temperature of from 60° to 70° C. 266 Parts of a salt-containing dark green powder are obtained which is dissolved in water with an intensely green color. If printing this dyestuff mixture by usual meon said
fiber material in the presence of an agent having an alkaline action, green prints are obtained which are very fast to the action of light and to washing.

If in the present Example an equivalent amount of the following coupling components is used instead of 1-(4'-sulfo-phenyl)-3-carboxy-pyrazolone-(5), dyestuff mixtures are obtained which have similar properties:
1-Phenyl-3-carboxy-pyrazolone-(5),
1-(2',5'-dichloro-4'-sulfo-phenyl)-3-methyl-pyrazolone-(5),
1-(4',8'-disulfo-2'-naphthyl)-3-methyl-pyrazolone-(5),
1-(4'-β-sulfatoethylsulfonyl-phenyl)-3-methyl-pyrazolone-(5),
1-(4'-β-sulfatoethylsulfonyl-phenyl)-3-carboxy-pyrazolone-(5),
1-(2'sulfo-phenyl)-3-methyl-pyrazolone-(5),
1-(3'sulfo-phenyl)-3-methyl-pyrazolone-(5),
1-(2',5'-disulfo-phenyl)-3-methyl-pyrazolone-(5),
1-(3'-carboxy-phenyl)-3-methyl-pyrazolone-(5),
1-(2'-methyl-4'-sulfo-phenyl)-3-methyl-pyrazolone-(5),
1-(2'-chloro-5'-sulfo-phenyl)-3-methyl-pyrazolone-(5),
1-(6'-chloro-2'-methyl-4'-sulfo-phenyl)-3-methyl-pyrazolone-(5),
1-(6'-sulfo-2'-naphthyl)-3-methyl-pyrazolone-(5),
1-(5',7'-disulfo-2'-naphthyl)-3-methyl-pyrazolone-(5),
1-(3'-nitro-phenyl)-3-carboxy-pyrazolone-(5),
1-(2'-sulfo-phenyl)-3-carboxy-pyrazolone-(5),
1-(2',5'-disulfo-phenyl)-3-carboxy-pyrazolone-(5), or
1-(4'-sulfo-phenyl)-3-carbethoxy-pyrazolone-(5).

EXAMPLE 4

(a) 97 Parts of copper phthalocyanine-(3)-tetrasulfonic acid chloride are introduced in the form of a moist paste into an ice cold, neutralized solution of 84.3 parts of the acid sulfuric acid ester of β-hydroxyethyl(4-amino-phenyl)-sulfone in 300 parts of water, while stirring thoroughly. Thereafter 5 parts of pyridine are added, and the mixture is stirred at 5° C. while adding continuously a 20% aqueous ammonia, thus maintaining a pH value of from 6.5 to 7. After about 3 hours, when the reaction has practically come to a stop, the reaction mixture is allowed to reach room temperature, and stirring is continued for another 15 hours at this temperature. The dyestuff formed is salted out with sodium chloride and potassium chloride and is filtered off.

(b) The moist dyestuff obtained is dissolved in 400 parts of water, and 30 parts by volume of a 31% hydrochloric acid are added. The residual acid sulfuric acid ester of β-hydroxyethyl-(4-amino-phenyl)-sulfone present in this dyestuff solution is diazotized at 5° C. by the addition of 19.5 parts by volume of an aqueous 5 N-sodium nitrite solution. Thereafter 25 parts of 1-(4'-sulfophenyl)-3-methyl-pyrazolone-(5) are strewn into the dyestuff solution. The coupling reaction is performed at the pH value of 6 which is adjusted and maintained by means of sodium carbonate. When the coupling has been completed, the intensely green dyestuff solution is filtered, and the product is isolated by spray-drying. 232 Parts of a salt-containing dyestuff mixture are obtained which is dissolved easily in water with a green color shade and dyes cotton according to the Cold-Dwell-dyeing process in clear green shades having a good fastness to washing and to light.

(c) If in the present Example an equivalent amount of the following amines is used instead of ammonia, dyestuff mixtures are also obtained which show similar good dyeing properties:

Methylamine, ethylamine, n-butylamine, benzylamine, dimethylamine, diethylamine, di-isopropylamine, piperidine, morpholine, 2-amino-ethane-1-carboxylic acid or 2-amino-ethane-1-sulfonic acid.

EXAMPLE 5

(a) 97 Parts of copper phthalocyanine-(3)-tetrasulfochloride are introduced in the form of a moist paste into a solution of 40.2 parts of $\beta$-hydroxyethyl-(3)-aminophenyl)-sulfone in 900 parts of water, while stirring thoroughly. Thereafter 10 parts by weight of pyridine are added, and the mixture is stirred at 10° C., a pH value of from 6.0 to 6.5 being maintained by continuous addition of sodium carbonate. After about 3 hours the reaction mixture is heated to 25° C., and stirring is continued for another 10 hours at this temperature.

(b) Subsequently 30 parts by volume of a 31% hydrochloric acid are added, the mixture is cooled to +5° C. by adding ice and is diazotized by the addition of 19 parts by volume of an aqueous 5 N-sodium nitrite solution. Stirring is continued for 10 minutes at this temperature, and subsequently 24.4 parts of 1-(4'-sulfo-phenyl)-3-methylpyrazolone-(5) are strewn into the dyestuff solution. The coupling reaction is performed at the pH value of 6 which is adjusted and maintained by addition of sodium carbonate. Upon completion of the coupling, the intensely green dyestuff solution is spray-dried.

(c) The dry and ground dark green dyestuff powder obtained is introduced into 1100 parts of concentrated sulfuric acid and is stirred for 5 hours at room temperature. Subsequently the solution obtained is poured onto a mixture of ice and potassium chloride, the precipitated ester dyestuff is filtered off and washed with potassium chloride solution. After drying, 237 parts of a salt-containing dyestuff mixture are obtained which may be used for the dyeing and printing of fiber materials of native and regenerated cellulose. It yields in the presence of an acid-binding agent dyeings and prints which are very fast to washing and to the action of light.

(d) Dyestuff mixtures showing similar properties are obtained, if in the present Example an equivalent amount of any one of the amines containing a $\beta$-hydroxyethylsulfone group and being specified at the end of the above Example 1 is used instead of the $\beta$-hydroxyethyl-(3-amino-phenyl)-sulfone used herein.

EXAMPLE 6

69.7 Parts of the acid sulfuric acid ester of $\beta$-hydroxyethyl-(4'-amino-phenyl)-sulfone are reacted according to paragraph (a) in Example 1, with 97 parts of copper phthalocyanine-(3)-tetrasulfonic acid chloride. The blue dyestuff solution obtained is mixed with 30 parts by volume of a 31% hydrochloric acid and then with 21.5 parts of an aqueous 5 N-sodium nitrite solution. Stirring is continued for 10 minutes at 5° C., and subsequently 36 parts of 1-(4'-$\beta$-sulfatoethyl-sulfonyl-phenyl)-3-methyl-pyrazolamine-(5) are strewn into the blue dyestuff solution. A pH value of from 6 to 7 is maintained by a continuous addition of sodium carbonate. Upon completion of the coupling the green dyestuff solution obtained is filtered and spray-dried. 261 Parts of a salt-containing dark green powder are obtained, which is dissolved in water with a green color shade. The dyestuff mixture obtained yields on wool and cellulose fiber materials strong green dyeings that are fast to light.

Dyestuff mixtures showing similar properties are obtained, if in the present Example an equivalent amount of the following pyrazolamines is used instead of the 1-(4'-$\beta$-sulfatoethyl-sulfonyl-phenyl)-3-methyl-pyrazolamine-(5):

1-(2'-Methoxy-5'-$\beta$-sulfatoethylsulfonyl-phenyl)-3-phenyl-pyrazolamine-(5),
1-(4'-sulfo-phenyl)-3-(4''-chloro-phenyl)-pyrazolamine-(5),
1-(2',5'-dichloro-4'-sulfo-phenyl)-3-phenyl-pyrazolamine-(5),
1-(2'-methyl-4'-sulfo-6'-chloro-phenyl)-3-phenyl-pyrazolamine-(5),
1-(2',5'-dichloro-4'-sulfo-phenyl)-3-(4''-acetoamino-phenyl)-pyrazolamine-(5),
1-(4'-sulfo-phenyl)-3-(3''-methyl-phenyl)-pyrazolamine-(5),
1-(4'-sulfo-phenyl)-3-methyl-pyrazolamine-(5), or
1-(2',5'-1 -dichloro-4'-sulfo-phenyl)-3-methyl-pyrazolamine-(5).

EXAMPLE 7

(a) 48.25 Parts of nickel phthalocyanine-(3)-tetrasulfonic acid chloride are introduced in the form of a moist paste, at 10° C., while stirring thoroughly, into a neutralized solution of 39.6 parts of the acid sulfuric acid ester of $\beta$-hydroxyethxl-(2-methyl-4-amino-5-methoxyphenyl)-sulfone in 110 parts by volume of water. Thereafter 1.25 parts of pyridine are added, and the mixture is stirred at 10° C., a pH value of from 6.0 to 6.5 being maintained by the continuous addition of sodium bicarbonate. After about 4 hours, when the reaction has practically come to a stop, the mixture is allowed to reach a temperature of from 20° to 25° C., and stirring is continued for another 10 hours.

(b) Subsequently 25 parts by volume of a 31% hydrochloric acid are added, the mixture is cooled by external cooling to +5° C. and is diazotized at this temperature with 9.2 parts by volume of an aqueous 5 N-sodium-nitrite solution. When the diazotization has been completed, 13.3 parts of 1-acetoacetylamino-3-methyl-5-methoxy-benzene-4-sulfonic acid are introduced in the form of a neutralized aqueous solution, and the coupling reaction is performed at a pH value of from 6.0 to 6.5 by the addition of sodium carbonate. Subsequently the intensely green dyestuff solution is filtered, and the product is isolated by spray-drying. 126 Parts of a salt-containing dark green powder is obtained which is very easily soluble in water and yields on textile materials of cellulose in the presence of an acid-binding agent green color shades which are fast to light and to washing.

(c) Further green fiber-reactive dyestuff mixtures are obtained which are suitable for the dyeing of cotton, wool or polyamide textiles, if there is used in the present Example, instead of the 1-acetoacetylamino-3-methyl-5-methoxy-benzene-4-sulfonic acid, an equivalent amount of the following coupling components:
1-Acetoacetylamino-benzene-4-sulfonic acid,
2-acetoacetylamino-napthalene-5,7-disulfonic acid,
2-acetoacetylamino-napthalene-6,8-disulfonic acid, 1-(4'-acetoacetylamino-benzoyl)-aminobenzene-2,5-disulfonic acid, or 1-acetoacetylamino-naphthalene-4,8-disulfonic acid.

EXAMPLE 8

69.7 Parts of the acid sulfuric acid ester of β-hydroxyethyl-(4'-amino-phenyl)-sulfone are condensed with 97 parts of copper phthalocyanine-(3)-tetrasulfonic acid chloride in accordance with Example 1, paragraph (a). The dyestuff solution obtained is cooled by external cooling to +5° C., then mixed with 30 parts by volume of a 31% hydrochloric acid and diazotized with 21.5 parts by volume of an aqueous 5 N-sodium nitrite solution, until the dissolved amine has reacted completely. Stirring is continued for another 20 minutes at 5° C., and thereafter 23.9 parts of 6-hydroxy-N-methyl-4-methyl-2-pyridone-3-sulfonic acid are added. The pH value of 5.8 is maintained by the continuous addition of sodium carbonate. Upon completion of the coupling the green dyestuff solution formed is filtered at 40° C., and the product is isolated by spray-drying. 256 Parts of a salt-containing dark green powder are obtained which is soluble in water with an intense green color shade. The dyestuff product thus prepared yields, in the presence of sodium carbonate, strong green cotton prints which are very fast to light and to washing.

If in the instant Example an equivalent amount of any one of the following coupling components is used instead of the 6-hydroxy-N-methyl-4-methyl-2-pyridone-3-sulfonic acid, green dyestuff mixtures are obtained which show similarly favorable properties:

6-Hydroxy-4-methyl-2-pyridone-3-sulfonic acid,
6-hydroxy-N-β-(4'-sulfo-phenyl)-ethyl-4-methyl-2-pyridone,
6-hydroxy-N-(4'-sulfo-benzyl)-4-methyl-3-amino-carbonyl-2-pyridone,
6-hydroxy-N-cyclohexyl-4-methyl-2-pyridone-3-sulfonic acid,
6-hydroxy-N-ethyl-4-ethyl-2-pyridone-3-sulfonic acid,
6-hydroxy-N-(4'-sulfo-phenyl)-4-methoxymethyl-2-pyridone-3-sulfonic acid,
6-hydroxy-N-ethyl-4-propyl-2-pyridone-3-sulfonic acid,
6-hydroxy-N-ethyl-4-methyl-3-cyano-2-pyridone, or
6-hydroxy-N-ethyl-4-methyl-3-sulfo-methyl-2-pyridone.

What is claimed is:

1. A process for the preparation of a fiber-reactive dye mixture of a phthalocyanine dyestuff of the formula (1)

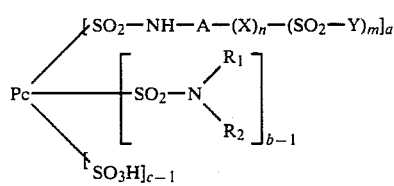

and an azo dyestuff of the formula (2)

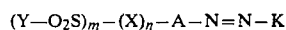

(each in the form of an acid or as a salt), which comprises reacting a phthalocyanine sulfochloride which in the form of the free acid corresponds to the formula (3)

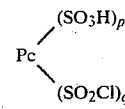

with an aromatic amine of the formula (4)

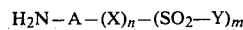

as such or—simultaneously or in any order—in conjunction with an amine of the formula (v)

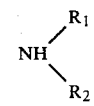

in water or in an organo-aqueous or in an organic solvent at a pH value of from about 4 to about 8 and at a temperature of from about −10° C. to about 100° C., in the presence of an acid binding agent, and subsequently diazotizing unreacted amine of the formula (4) and coupling said diazotized amine with a coupling component of the formula (6)

$$H-K \qquad (6),$$

wherein:

Pc is a metal-free or metal-containing phthalocyanine, which is unsubstituted except by substituents as indicated in formula (1) which are arranged in the 3- or 4-position of the carbocyclic aromatic nuclei of the phthalocyanine skeleton, or substituted additionally by substituents as indicated in formula (1) which are arranged in the 3- or 4-positions of the carbocyclic aromatic nuclei of the phthalocyanine, or by phenyl or halogen, A is phenylene or naphthylene which is unsubstituted or substituted by substituents selected from the group consisting of hydroxy, lower alkyl, lower alkoxy, sulfo, carboxy, halogen, nitro, phenylamino, lower alkanoylamine, benzoylamino, phenylsulfonylamino, phenylamino, benzoylamino and phenylsulfonylamino, which are substituted by lower alkyl, lower alkoxy and/or halogen;

X is the group —CH$_2$— or —N(CH$_3$)—;

Y is vinyl, β-sulfatoethyl or β-hydroxyethyl;

R$_1$ and R$_2$ are identical or different and each is hydrogen, unsubstituted or substituted alkyl, or unsubstituted or substituted phenyl or R$_1$ and R$_2$ form a ring together with the nitrogen atom;

m is the number 1 or 2;

n is the number 0 or 1;

a, b and c are identical or different and each is a whole or fractional number of from 1 to 4, the sum of (a+b+c) is a whole or fractional number of 6 at a maximum;

p is a whole or fractional number of from 0 to 3, q is a whole or fractional number of from 1 to 4, the sum of (p+q) is a whole or fractional number of 4 at a maximum, and K is the radical of a pyrazolone, an aminopyrazole, a pyridone or of a methylene carboxylic acid arylamide coupling component.

2. A process according to claim 1 for the preparation of a reactive mixture of dyestuffs of formulae (1) and (2), in which Pc is a copper or nickel phthalocyanine as defined in claim 10, A is phenylene which is unsubstituted or substituted once or twice by substituents selected from the group consisting of lower alkyl and lower alkoxy, n is the number zero, Y is vinyl or β-sulfatoethyl, a and c are defined as in claim 10 and b is 1, which comprises reacting a compound of formula (3) wherein Pc is defined as above and p and q have the meanings given in claim 10, with an amine of formula (4) wherein A, Y, m and n are defined as above, and subsequently diazotizing unreacted amine of formula (4) and coupling it with a coupling component of formula (6) wherein K is the radical of a pyrazolone or a pyridone coupling component.

3. A process according to claim 1 for the preparation of a fiber-reactive dye mixture of a copper phthalocyanine dyestuff of the formula (1a)

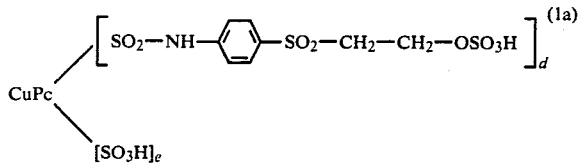

and an azo dyestuff of the formula (2a)

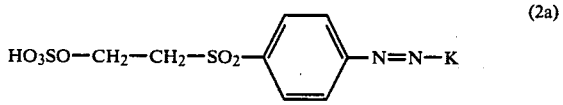

in which d and e are identical or different and each is a whole or fractional number of from 1 to 4, the sum of (d+e) is a whole or fractional number of 4 at a maximum, and K is the radical of a pyrazolone or pyridone coupling component, which comprises reacting a copper phthalocyanine sulfochloride which in the form of the free acid has the general formula (3a)

in which p and q are defined as in claim 2, with an aromatic amine of formula (4a)

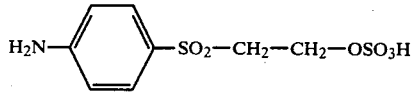

and subsequently diazotizing unreacted amine of formula (4a) and coupling it with a coupling component of the formula H - K wherein K is defined as above.

4. A process for the preparation of a fiber-reactive dyestuff composition which comprises reacting a phthalocyanine substituted by at least one sulfonic acid chloride group with an aromatic amine having at least one fiber-reactive group of the formula —SO₂—Y—, wherein Y is vinyl, β-sulfatoethyl or β-hydroxyethyl, diazotizing unreacted amine in the reaction mixture, and coupling the resulting diazo compound with a pyrazolone, aminopyrazole, pyridone or methylene-carboxylic acid-arylamide coupling component.

5. A dyestuff composition prepared by the process of claim 4.

6. A process according to claim 1 for the preparation of a reactive dyestuff mixture of a nickel phthalocyanine dyestuff of the formula (1b)

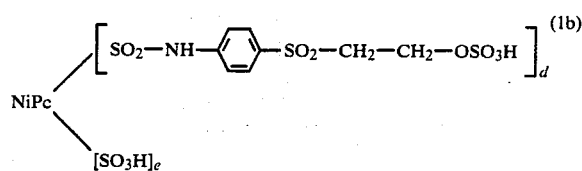

wherein d and e are the same or different and each is a whole or fractional number of from 1 to 4, the sum of (d+e) being a whole or fractional number no greater than 4, and an azo dyestuff of the formula (2a)

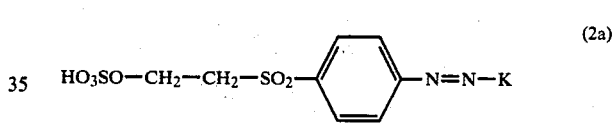

wherein K is the radical of a pyrazolone or pyridone coupling component, which comprises reacting a nickel phthalocyanine sulfochloride which in the form of the free acid has the formula (3b)

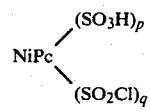

with an aromatic amine of formula (4a)

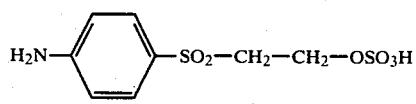

and subsequently diazotizing unreacted amine of formula (4a) and coupling it with a coupling component of the formula H-K in which K is the radical of a pyrazolone or pyridone coupling component.

* * * * *